July 7, 1964     E. W. HAMER     3,139,687
ATHLETIC VISUAL TRAINING AID

Filed Feb. 18, 1960     2 Sheets-Sheet 1

FIG. I

INVENTOR.
EDWIN W. HAMER
BY
ATTORNEYS

July 7, 1964

E. W. HAMER 3,139,687

ATHLETIC VISUAL TRAINING AID

Filed Feb. 18, 1960

INVENTOR.
EDWIN W. HAMER

BY Barnes & Seed

ATTORNEYS

3,139,687
ATHLETIC VISUAL TRAINING AID
Edwin W. Hamer, 825 92nd NE., Bellevue, Wash.
Filed Feb. 18, 1960, Ser. No. 9,511
2 Claims. (Cl. 35—7)

The present invention relates to visual training aid apparatus for use by athletic coaches to illustrate recommended player movements for a given play or situation, and particularly well adapted for use in baseball instruction.

In the past, baseball coaches have had to rely upon oral explanation alone or coupled with blackboard demonstration for off-field player instruction. This invention aims to provide a visual aid of simple and economical construction which can be more easily and effectively used than a blackboard to teach baseball tactics and science and those of other group sports such as football, basketball, etc.

The invention further aims to provide such a device which is durable and portable so as to be readily usable at the field during practices and games as well as under cover.

More particular objects and advantages will appear and be understood in the course of the following description and claims, the invention consisting in the novel construction and in the adaptation and combination of parts hereinafter described and claimed.

Figure 1:
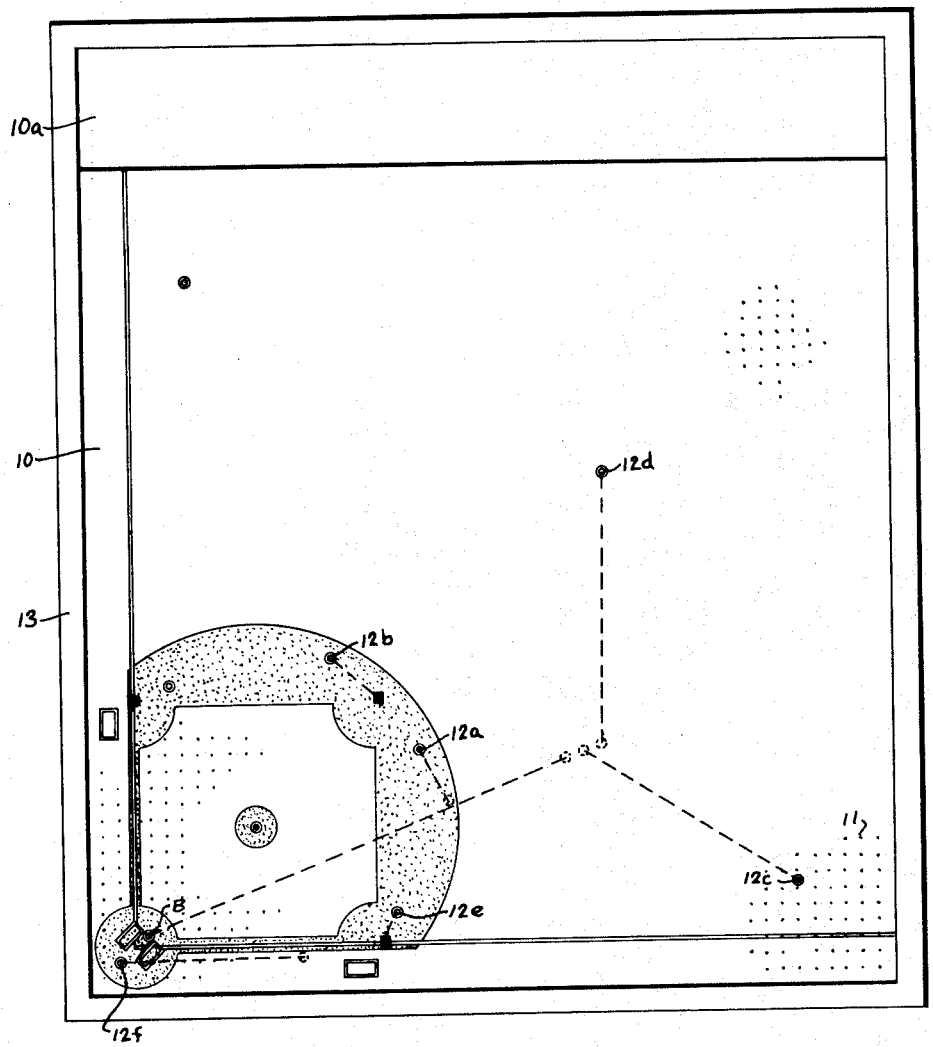
FIG. 1 is a plan view of a board embodying the invention.
Figure 2:
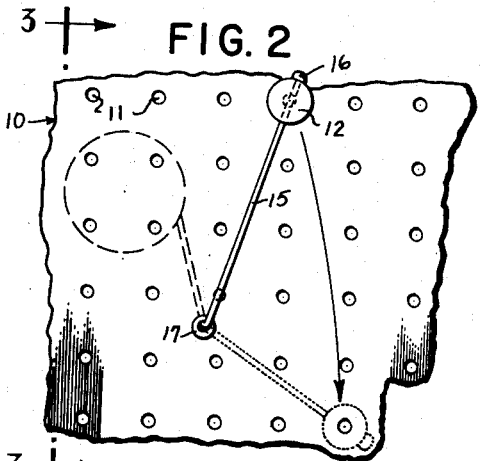
FIG. 2 is a detail fragmentary plan view of part of the board.

Referring to the drawings, for purposes of example I have illustrated my invention as applied to a visual aid for instructing baseball. A board 10 of fiberboard, sheet metal, plastic sheeting, or some other suitable material is perforated at regular intervals both lengthwise and crosswise to provide multiple holes 11 for selectively receiving various indicators 12. The board has a border frame 13 and is preferably painted to clearly show the bases, infield, pitcher's box, base running paths, outfield, foul lines, etc. A section of blackboard 10a may be provided at the top for written comments or instructions.

Figure 3:
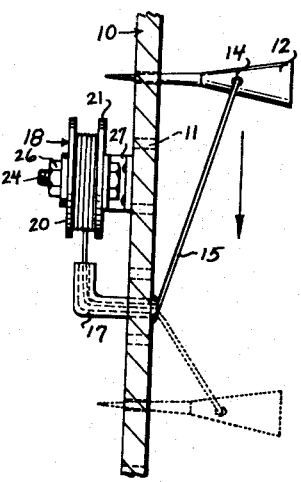
FIG. 3 is a vertical sectional view taken along the line 3—3 of FIG. 2.

As shown in FIG. 3, the indicators 12 may each be of the shape of a golf tee, i.e. having an enlarged head with a tapered shank. The latter reduces to a size which can be inserted into the holes 11. Each indicator 12 has its head laterally bored at 14 for receiving one end of a respective indicating line 15 which is held by a terminal knot 16. The term "line" as used herein is intended to be generic to string, cord, wire tape, and similar items.

Figure 4:
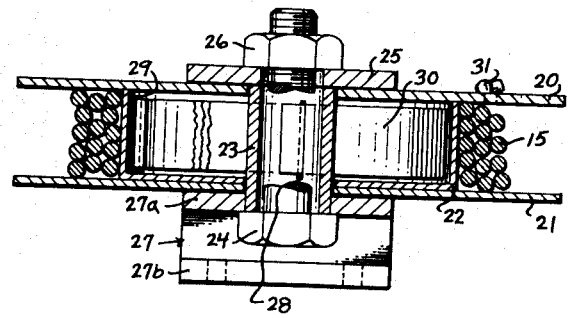
FIG. 4 is a longitudinal sectional view to an enlarged scale of one of the reel assemblies.

The lines 15 are threaded through respective of L-shaped guide tubes 17 each of which has one of its legs passing forwardly through an opening in the board and peened to prevent withdrawal thereof. From their guide tubes the lines 15 travel at the back of the board to adjacent self-winding reels 18 on which they are wound. A suitable reel is detailed in FIG. 4 wherein it is seen that the reel's spool comprises a pair of cheek plates 20–21 facing against a drum 22. Said parts of the spool are rotatable together about a bushing 23 which is clamped between the head of a bolt 24 passing therethrough and a washer 25 engaged by the nut 26 of the bolt. The cheek plates 20–21 are in turn confined by the washer 25 and one leg 27a of a U-bracket 27 having its other leg 27b screwed or otherwise mounted on the back face of the board 10. It will be noted that the bushing 23 and the rim of the drum 22 have longitudinal slots 28–29 which receive the inner and outer ends, respectively, of a clock spring 30 which is coiled therebetween for making the reel self-winding. Anchoring of the line 15 to the reel may be accomplished by passing the line rearwardly through an aperture in the cheek 20 and forming a terminal knot 31.

The guide tubes 17 are located at the normal fielding positions of baseball players, each of the players being represented by a respective indicator 12. An indicator, denoted B, is also provided at home plate to represent the baseball in play.

In FIG. 1 I have illustrated by broken lines a possible coach's movement of the player indicators to represent recommended movements of the players responsive to a low line drive into short right field. The second baseman 12a goes after the ball and the shortstop 12b shifts to cover second base. As the right fielder 12c also goes after the ball he is backed up by the center fielder 12d. Similarly the first baseman 12e who has moved toward the bag at first is backed up by the catcher 12f. All of these movements can be clearly seen by the trainee players by following the lines 15 of the respective player indicators which have been partially unwound from their reels responsive to the coach's movement of the indicators. In this regard, the lines 15 should be white or some other color contrasting to those of the board. When the indicators are moved back to their starting positions at the close of such a demonstration, the lines 15 are automatically rewound.

Figure 5:
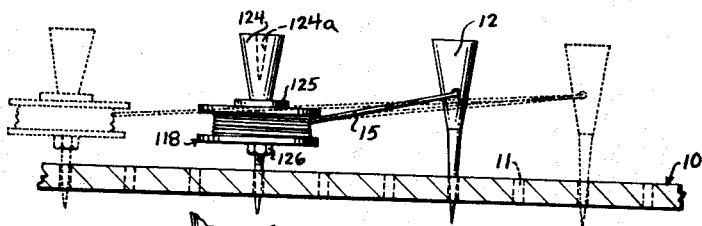
FIG. 5 is an elevational view illustrating a modified reel arrangement.
Figure 6:
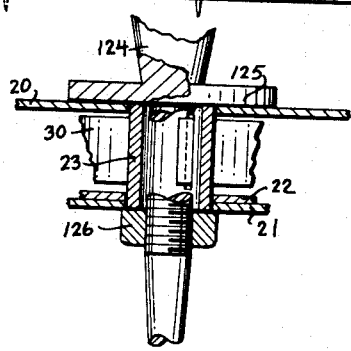
FIG. 6 is a fragmentary detail view partly in vertical section of the reel unit of FIG. 5.

In FIGS. 5–6 I have illustrated a modified arrangement as for football visual aid wherein it is desired to frequently change the players' starting positions. In this case the reels, denoted 118, are located at the front of the board and are mounted on tapered pegs 124 which take the place of the bolt 24. The shank of each peg is threaded to receive a nut 126 which together with an annular flange 125 on the peg grips a bushing 23 for journaling a spool assembly the same as that afore described. A tapered hole 124a may be provided in the top of the head 124b of each peg to receive the shank of the respective player indicator 12 so that each such indicator and its related reel can be located at the same starting point if desired. In all other respects operation of the modified unit is the same as before detailed.

It is thought that the invention will have been clearly understood from the foregoing detailed description. Changes will suggest themselves and may be resorted to without departing from the spirit of the invention, wherefore it is my intention that no limitations be implied and that the hereto annexed claims be given a scope fully commensurate with the broadest interpretation to which the employed language admits.

What I claim is:

1. A visual aid comprising, a board with a plurality of holes exposed to the front thereof, an indicator adapted to be selectively inserted in said holes, a line secured at one end to said indicator, and a self winding reel assembly operatively receiving the other end of said line and adapted to be selectively inserted in said holes for indicating a starting position, whereby the line will show the path of said indicator from said starting position to a selected one of said holes.

2. The structure of claim 1 in which said reel assembly has an opening at the top for holding said selector.

References Cited in the file of this patent

UNITED STATES PATENTS

| | | |
|---|---|---|
| 1,042,142 | Pohlig | Oct. 22, 1912 |
| 1,293,928 | Riemann | Feb. 11, 1919 |
| 1,756,040 | Taft | Apr. 29, 1930 |
| 1,891,654 | Simon | Dec. 20, 1932 |
| 2,070,431 | Hoppmann | Feb. 9, 1937 |
| 2,149,325 | White | Mar. 7, 1939 |
| 2,158,368 | Hurt | May 16, 1939 |
| 2,589,812 | Hoskins | Mar. 18, 1952 |
| 2,933,316 | Mancini | Apr. 19, 1960 |